United States Patent [19]

Sumiya et al.

[11] Patent Number: 4,697,474
[45] Date of Patent: Oct. 6, 1987

[54] LOCK-UP CLUTCH CONTROL DEVICE FOR A MULTI-SPEED AUTOMATIC TRANSMISSION

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Toyota Jidosha Kabushiki Kaisha; Aisin-Warner Kabushiki Kaisha, both of Aichi, Japan

[21] Appl. No.: 846,042

[22] Filed: Mar. 31, 1986

[30] Foreign Application Priority Data

Jul. 31, 1985 [JP] Japan .................. 60-169195

[51] Int. Cl.$^4$ ...................... F16H 47/00; F16H 57/10
[52] U.S. Cl. .................... 74/733; 74/752 C; 192/0.076; 192/3.31
[58] Field of Search ................ 74/645, 733, 732, 731, 74/730, 740, 752 C; 192/3.33, 3.32, 3.31, 3.3, 3.29, 3.28, 3.57, 3.58, 0.076

[56] References Cited

U.S. PATENT DOCUMENTS 4,349,088  9/1982  Ito et al. ................. 192/3.3
4,367,812  1/1983  Kobayashi et al. ........ 192/3.3
4,512,212  4/1985  Ishikawa ................. 74/733 X
4,588,059  5/1986  Miki et al. ............. 192/3.31 X

FOREIGN PATENT DOCUMENTS 57-37140  3/1982  Japan .

Primary Examiner—George H. Krizmanich
Attorney, Agent, or Firm—Wenderoth, Lind & Ponack

[57] ABSTRACT

A lock-up clutch control device for an automatic transmission having a torque converter with a lock-up clutch and a speed changing gear mechanism including a sub-transmission unit and a main transmission unit. The device has a lock-up operation device for producing a control signal when the sub-transmission unit is in the higher speed mode or when the main transmission unit selects 2nd or a higher speed gear. The control signal is delivered to a lock-up relay valve which operates effectively while it receives the control signal. Therefore, the torque converter can be locked up at 2nd or higher speeds of the automatic transmission which, because of various combinations of the states of the sub-transmission and main transmission units, outputs multiple speed.

5 Claims, 14 Drawing Figures

FIG. 6

| position | | solenoid valve | | | | | clutch | | | brake | | | | OWC | | |
|---|---|---|---|---|---|---|---|---|---|---|---|---|---|---|---|---|
| | | S₁ | S₂ | S₃ | S_L | S_D | C₀ | C₁ | C₂ | B₀ | B₁ | B₂ | B₃ | F₀ | F₁ | F₂ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| | 2nd | × | ○ | ○ | ◎ | ※ | ○ | ○ | × | ○ | × | × | × | × | × | ⊗ |
| | 3rd | ○ | ○ | × | ◎ | ※ | ○ | ○ | × | × | × | ○ | × | ○ | ⊗ | × |
| | 4th | ○ | ○ | ○ | ◎ | × | ○ | ○ | × | × | ○ | ○ | × | × | ⊗ | × |
| | 5th | ○ | × | × | ◎ | × | × | ○ | ○ | × | × | ○ | × | ○ | × | × |
| | 6th | ○ | × | ○ | ◎ | × | × | ○ | ○ | × | ○ | ○ | × | × | × | × |
| | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| | 2nd | × | ○ | ○ | ◎ | ※ | ○ | ○ | × | ○ | × | × | × | × | × | ⊗ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | × | ○ | ○ | × | × | ○ | × |
| | 5th | ○ | × | × | ◎ | × | × | ○ | ○ | × | × | ○ | × | ○ | × | × |
| | 6th | ○ | × | ○ | ◎ | × | × | ○ | ○ | × | ○ | ○ | × | × | × | × |
| | (5th) | × | × | × | × | × | ○ | ○ | ○ | × | × | ○ | × | × | × | × |
| L | 1st | × | ○ | × | × | × | ○ | ○ | × | × | × | × | ○ | ○ | × | ○ |
| | 2nd | × | ○ | ○ | ◎ | ※ | × | ○ | × | ○ | × | × | ○ | × | × | ○ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | × | ○ | ○ | × | × | ○ | × |
| | (1st) | × | × | × | × | × | ○ | ○ | × | × | × | × | ○ | ○ | × | ○ | note:
| | | | |
|---|---|---|---|
| ○ | ON | engaged | locked |
| × | OFF | released | free |
| ◎ | ON L-UP ON / OFF L-UP OFF | — | — |
| ⊗ | — | — | free when coasting |
| ※ | actuated when sifting 2→3 | | |

6th

R

LOCK-UP CLUTCH CONTROL DEVICE FOR A MULTI-SPEED AUTOMATIC TRANSMISSION

BACKGROUND OF THE INVENTION

1. Field of the Invention

The present invention relates to an automotive automatic transmission and, more particularly, to a device for controlling the operation of a lock-up clutch incorporated in a multi-speed automatic transmission which is composed of a main transmission unit and a sub transmission unit.

Generally, an automatic transmission has a torque converter and a planetary speed changing gear mechanism. The planetary speed changing gear mechanism is composed mainly of an overdrive (O/D) planetary gear unit, a front planetary gear unit and a rear planetary gear unit. The planetary speed changing gear mechanism performs, under the control of two solenoid valves and three shift valves, a speed change over four forward speeds and one reverse speed.

2. Description of the Related Art

In the known automatic transmission of the type described, the torque converter incorporates a lock-up clutch which is controlled such that it can lock-up the torque converter when the second or higher speed gear is selected. To this end, the controller for the lock-up clutch delivers, as the controlling pressure for controlling the lock-up relay valve and the solenoid valve thereof, a hydraulic pressure which is taken off of a line leading to a second brake $B_2$.

The inventors have already proposed, as in Japanese Patent Laid-Open Publication No. 37140/1982, an automatic transmission in which, by using the overdrive planetary gear unit as a sub transmission unit and the front and rear planetary gear unit as a main transmission unit, six forward speeds are attained through a suitable control of three solenoid valves and three shift valves.

More specifically, in this multi-speed automatic transmission having the sub-transmission unit and the main transmission unit, the sub-transmission unit provides two speeds, i.e., the overdrive speed and the direct-coupling speed, while the main transmission unit selects one of 1st, 2nd and 3rd speed gears, so that six speeds are obtained by combining both transmission units. However, if the lock-up relay valve and the solenoid valve are controlled by the hydraulic pressure derived from the second brake $B_2$ as in a known automatic transmission, a problem will be encountered in that, when the sub-transmission unit is upshifted from the direct-coupling speed to the overdrive speed while the main transmission unit selects the 1st speed gear, i.e., when the automatic transmission as a whole selects the second speed amongst the six speeds, the control pressure cannot be supplied to the lock-up relay valve and the solenoid valve, so that the lock-up clutch cannot be engaged, resulting in a disadvantage in that the lock-up clutch cannot be fully utilized.

SUMMARY OF THE INVENTION

Accordingly, an object of the invention is to provide a lock-up clutch control device for a multi-speed automatic transmission, in which the control pressure for controlling the lock-up clutch is supplied even when the automatic transmission as a whole selects the second speed, thereby overcoming the above-described problems of the prior art.

To this end, according to the invention, there is provided a lock-up clutch control device having a lock-up operation means which is adapted to produce a control signal when the sub-transmission unit is in the higher speed mode or when the main transmission unit selects 2nd or a higher speed gear, and a lock-up relay valve adapted to operate effectively only when it receives the control signal.

In a preferred form of the invention, the lock-up operation means is constituted by a cut-back valve which imparts a cut-back pressure to the throttle valve. The cut-back valve is adapted to be switched such that it assumes a cut-back pressure supply position when the sub-transmission unit is in the higher speed mode or when the main transmission unit selects 2nd or a higher speed gear. The cut-back valve is provided with a port which communicates with control oil chambers of the lock-up solenoid valve and the lock-up relay valve, the port being adapted to communicate with a port which is supplied with the hydraulic pressure when the cut-back valve is in the cut-back pressure supply position, while at least the manual valve selects the D range.

The automatic transmission to which the invention pertains can provide multiple speeds by virtue of a combination of a plurality of speeds each of which is provided by the sub-transmission and main. In addition, when the automatic transmission as a whole selects second speed or a higher speed, the hydraulic pressure is supplied to the oil passage leading to the lock-up solenoid valve, thereby allowing the lock-up relay valve to operate effectively. Consequently, the lock-up clutch can be engaged to lock-up the torque converter when the automatic transmission selects second or a higher speed, thus attaining a further reduction in the fuel consumption, as well an improvement in the driveability such as a reduction of noise level, an improvement in the acceleration and a high response. In addition, according to the invention, the spool of the cut-back valve is moved to the cut-back pressure supply position when the sub transmission unit is in the higher speed mode or when the main transmission unit selects 2nd or a higher speed gear, while allowing the supply of the control pressure to pass to the lock-up solenoid valve through the cut-back valve. Therefore, the supply of the lock-up control pressure can be attained adequately by a simple modification of the oil passage and the cut-back valve, without requiring a substantial change in the design.

BRIEF DESCRIPTION OF THE DRAWINGS

FIG. 6 is a table showing states of various constituents of the automatic transmission in different speed positions;

DESCRIPTION OF THE PREFERRED EMBODIMENTS

A preferred embodiment of the invention will be described hereinunder with reference to the accompanying drawings.

Figure 1:
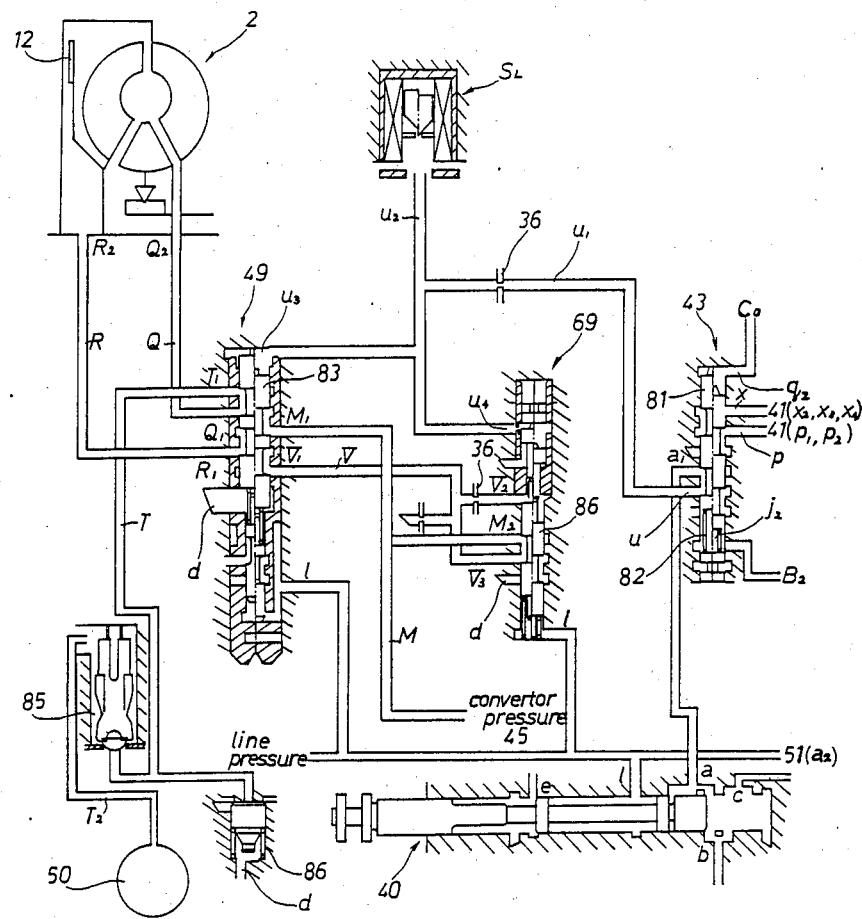
FIG. 1 is a schematic illustration of a lock-up clutch control device in accordance with the invention.

Referring first to FIG. 1, a cut-back valve 43 has a spool 81 which is urged upwardly by a spring 82. An upper chamber $q_2$ of the cut-back valve 43 communicates with an O/D direct clutch Co, while a lower chamber $j_2$ communicates with the second brake $B_2$ of the main transmission unit. The arrangement is such that, when the sub-transmission unit selects the overdrive speed or when the main transmission unit selects 2nd or a higher speed gear, the spool 81 is positioned at a cut-back pressure supply position (shown at left half part in FIG. 1). The cut-back valve 43 further has a port u which communicates with both a lock-up solenoid valve $S_L$ and the control oil chamber $u_3$ of the lock-up relay valve 49. The cut-back valve 43 further has a port $a_1$ which communicates with a port a which in turn communicates with line pressure port l when the manual valve 40 is positioned to select the D range. When the spool 81 is held in the cut-back pressure supply position, the port u and the port $a_1$ communicate with each other.

Figure 7:
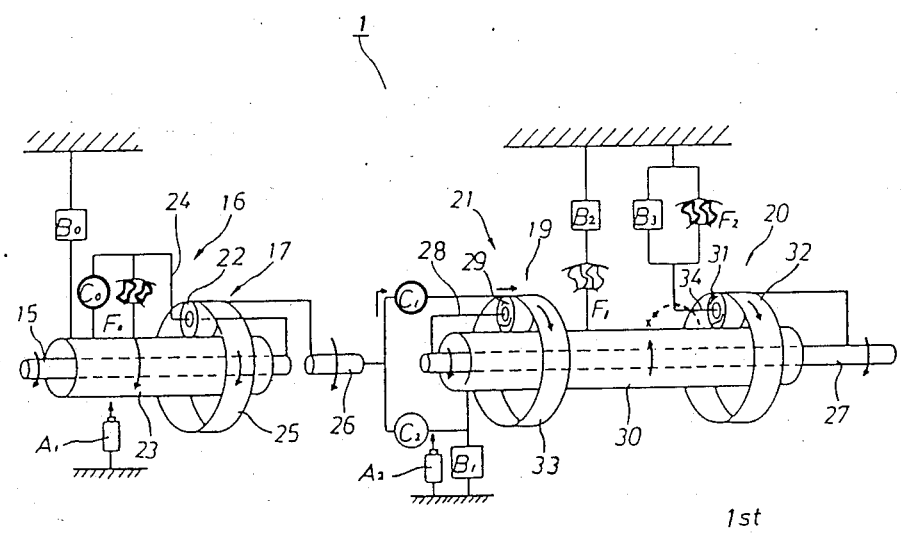
FIGS. 7 to 13 are illustrations showing the operation of the automatic transmission in different states.

FIG. 7 shows a state in which the O/D-direct clutch Co is engaged so that the sub-transmission unit 16 selects the direct-coupling speed, while the forward clutch $C_1$ in the main transmission unit 21 is engaged so that the main transmission unit 21 selects the 1st speed gear. Thus, the automatic transmission 1 as a whole selects the first speed. In this state, the line pressure produced as a result of the engagement of the clutch Co is applied to the upper chamber $q_2$ of the cut-back valve 43, while no pressure acts in the lower chamber $j_2$ of the same. Therefore, the cut-back valve 43 is in the position illustrated in the right half part of FIG. 1. Namely, the spool 81 is pressed down against the force of the spring 82 so as to disconnect the port x from the port p. Therefore, the cut-back pressure is not supplied to a throttle valve 41. This operation of the cut-back valve 43 applies also to the case when the manual valve is positioned in the R (reverse) range (see FIG. 13), N range and P range because the O/D-direct clutch Co is supplied with the hydraulic pressure while the brake $B_2$ does not engage in each of these ranges.

When the first speed is selected, the cut-back valve 43 disconnects the port $a_1$ and the port u from each other, so that the hydraulic pressure is supplied neither to the oil passage $u_2$ leading to the lock-up solenoid $S_L$ nor to the control oil chamber $u_3$ of the lock-up relay valve 49. Therefore, the relay valve 49 is held at the position shown in the left half part even when an exciting signal is applied to the solenoid $S_L$. Consequently, the converter pressure from a passage M is introduced to the lock-up-off port $R_2$ of the torque converter 2, through the ports $M_1$ and $R_1$ of the relay valve 49. The converter pressure is further introduced to an oil passage T through the torque converter 2 via the on port $Q_2$ of the converter 2, and the ports $Q_1$ and $T_1$ of the relay valve 49. The converter pressure is then discharged to the oil cooler 50. Consequently, the lock-up clutch 12 is disengaged, so that the power of the engine is transmitted to the speed changing gear mechanism 3 through the torque converter 2. When the manual valve 40 is positioned to select the R, N or P range, the port a of the manual valve 40 is drained, so that the port $a_1$ is also drained. Therefore, the lock-up relay valve 49 assumes the position shown at the left half part of the drawings regardless of the state of the cut-back valve 43. Thus, the lock-up relay valve 49 functions in the same manner as that in the case where the first speed is selected.

Figure 8:
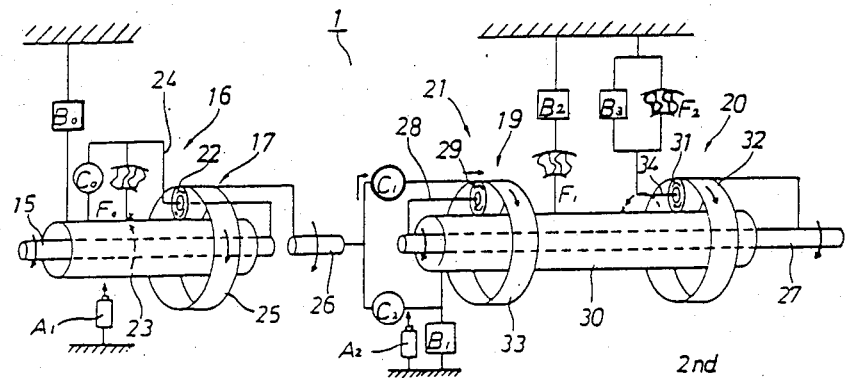

FIG. 8 shows the state of the automatic transmission in which the transmission as a whole has been upshifted from the first speed to the second speed. In this state, the forward clutch $C_1$ is kept in the engaged state so that the main transmission unit 21 still selects the 1st speed gear. On the other hand, in the sub transmission unit 16, the brake Bo is engaged while the O/D-direct clutch Co is disengaged, so that the sub transmission unit 16 is upshifted from the direct-coupling speed to the O/D speed. Consequently, the hydraulic oil in the upper chamber $q_2$ of the cut-back valve 43 is drained as a result of the disengagement of the O/D direct clutch Co, so that the spool 81 in the valve 43 moves upwardly under the force of the spring 82, as shown in left half part in FIG. 1, whereby the port x is brought into communication with the port p. As a result, the cut-back pressure is supplied through the ports $p_1$ and $p_2$, so that the spool 79 is forced back against the force of the spring 76, thereby setting the throttle pressure at a low level.

Figure 9:
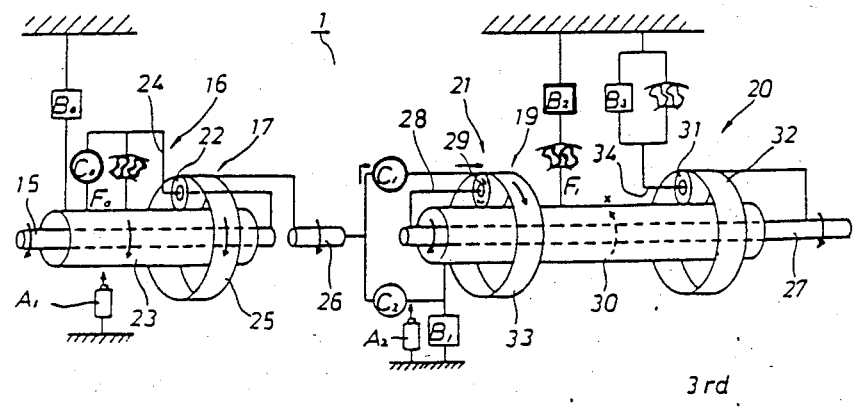

FIG. 9 shows the state of the automatic transmission after upshifting from the second speed to the third speed. In this case, both the forward clutch $C_1$ and the brake $B_2$ are engaged so that the main transmission unit 21 selects the second speed gear. On the other hand, in the sub-transmission unit 16, the brake Bo is disengaged while the clutch Co is engaged, thus effecting a downshift from the O/D speed to the direct-coupling speed. In this state, the hydraulic pressure is supplied to both the upper chamber $q_2$ and the lower chamber $j_2$ of cut-back valve 43, so that the spool 81 is held in the upper position (position shown in the left half part in FIG. 1), because the upward force which is the sum of the force of the spring 82 and the force produced by the pressure in the lower chamber $j_2$ exceeds the downward force which is produced by the pressure acting in the upper chamber $q_2$. The communication between the ports x and p, therefore, is also maintained in this state.

As the transmission as a whole is upshifted to the higher speeds, i.e., to the fourth, fifth and sixth speeds, the brake $B_2$ in the main transmission unit 21 is kept in the engaged state, while the direct clutch Co in the sub-transmission unit is alternatingly engaged and disengaged. The alternating switching of the state of the clutch Co causes an alternating supply and discharge of the hydraulic pressure to and from the upper chamber $q_2$ of the cut-back valve 43. However, the spool 81 of the cut-back valve 43 is held in the cut-back pressure supply position (position shown in the left half-part in FIG. 1), because the hydraulic pressure is continuously appied to the lower chamber $j_2$, regardless of the pressure in the upper chamber $q_2$.

When the automatic transmission selects one of the second, third, fourth, fifth and sixth speeds, the port $a_1$ of the cut-back valve 43 is maintained in communication with the port u, so that the line pressure is supplied from the port a to the oil passages $u_1$ and $u_2$. If the solenoid of the lock-up solenoid valve $S_L$ is energized in this state, the hydraulic pressure is supplied to the control oil chamber $u_3$ of the relay valve 49, so that the state of this valve 49 is changed to that shown in the right half part in FIG. 1. As a result, the converter pressure from the oil passage M is introduced to the lock-up-on port $Q_2$ of the torque converter 2 through the ports $M_1$ and $Q_1$, thereby causing the lock-up clutch 12 to engage. The converter pressure is discharged from the off port $R_2$ and is drained from the drain port d via the ports $R_1$ and $V_1$ of the relay valve 49 and the port $V_3$ of the lock-up control valve 69 which is in the position shown in the right half part in FIG. 1.

A practical embodiment of the invention will be explained hereinunder with reference to the accompanying drawings.

Figure 2:
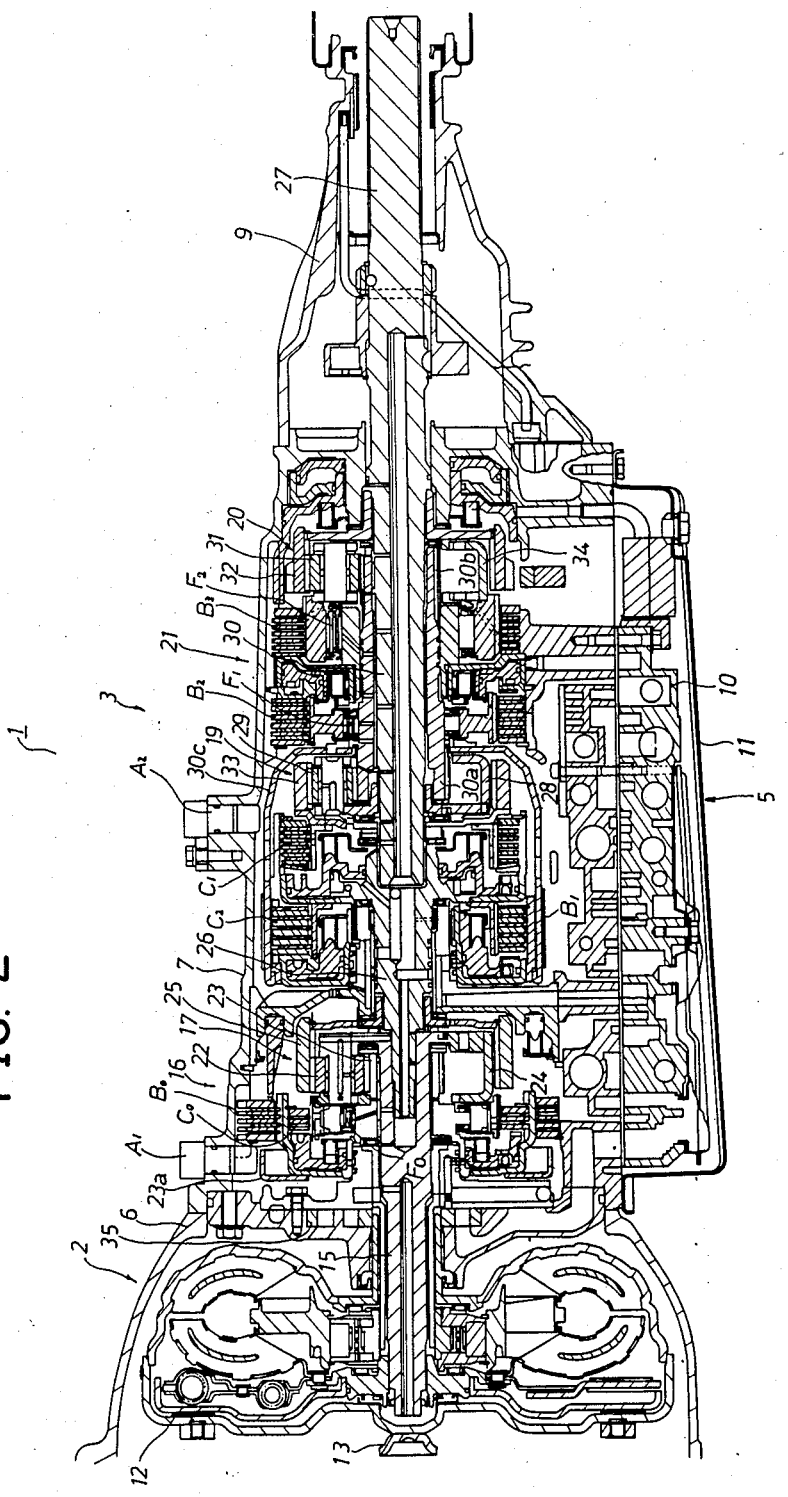
FIG. 2 is a vertical sectional view of the whole portion of an automatic transmission to which the invention is applied.

As shown in FIG. 2, a multi-speed automatic transmission 1 is equipped with a torque converter 2, planetary speed changing gear mechanism 3 and a hydraulic control mechanism 5 which are housed, respectively, in a converter housing 6, a transmission case 7 and extension housing 9, and a valve body 10 and oil pan 11. The torque converter 2 has a lock-up clutch 12. The power supplied to the input shaft 13 of the torque converter 2 is transmitted to the input shaft 15 of the speed changing gear mechanism 3 through the intermediary of the oil in the torque converter or, alternatively, through the lock-up clutch 12. The speed changing gear mechanism 3 is composed of a sub-transmission unit 16 constituted by an O/D planetary gear unit 17, and a main transmission unit 21 constituted by a front planetary gear unit 19 and a rear planetary gear unit 20. The O/D planetary gear unit 17 is composed of a carrier 24 directly connected to the input shaft 15 and supporting planet gears 22, a sun gear 23 on the input shaft 15, and a ring gear 25 directly connected to the input shaft 26 of the main transmission unit 21. An O/D-direct clutch Co and a one-way clutch Fo are connected between the carrier 24 and the sun gear 23, while an O/D brake Bo is connected between the sun gear 23 and the case 7. The front planetary gear unit 19 has a carrier 28 directly connected to the output shaft 27 and supporting planet gears 29, a sun gear $30a$ on the output shaft 27 and formed as a unit with the sun gear $30b$ of the rear planetary gear unit 20, and a ring gear 33 which is connected to the input shaft 26 through a forward clutch $C_1$. A direct clutch $C_2$ is connectd between the input shaft 26 and the sun gear $30a$, while a coast brake $B_1$ is provided to act between the sun gear $30a$ and the case 7. A one-way clutch $F_1$ and a brake $B_2$ for locking the outer race of the clutch $F_1$ is disposed to act between the sun gear $30a$ and the case 7. Finally, the rear planetary gear unit 20 has a carrier 34 carrying planet gear 31, the sun gear $30b$ mentioned above, and a ring gear 32 directly connected to the output shaft 27. A brake $B_3$ and a one-way clutch $F_2$ are arranged in parallel with each other between the carrier 34 and the case 7. In FIG. 2, a reference numeral 35 denotes an oil pump.

A rotation sensor $A_1$ constituted by a photo-electric sensor or a magnetic sensor is mounted on the portion of the case 7 around the O/D planetary gear unit 17. On the other hand, slits or holes are formed at a regular interval in the flange piece $23a$ connected to the sun gear 23. Thus, the rotation sensor $A_1$ is capable of detecting the rotational speed of the sun gear 23, i.e., the state of shift of the sub-transmission unit 16. A similar rotation sensor $A_2$ is mounted on the portion of the case 7 near the front planetary gear unit 19. Furthermore, notches or holes are formed at a regular interval in a clutch connecting piece $30c$ which extends from the sun gear 30. Thus, the rotational sensor $A_2$ detects the rotation speed of the sun gear 30, i.e., the state of shift of the main transmission unit 21.

Figure 3:
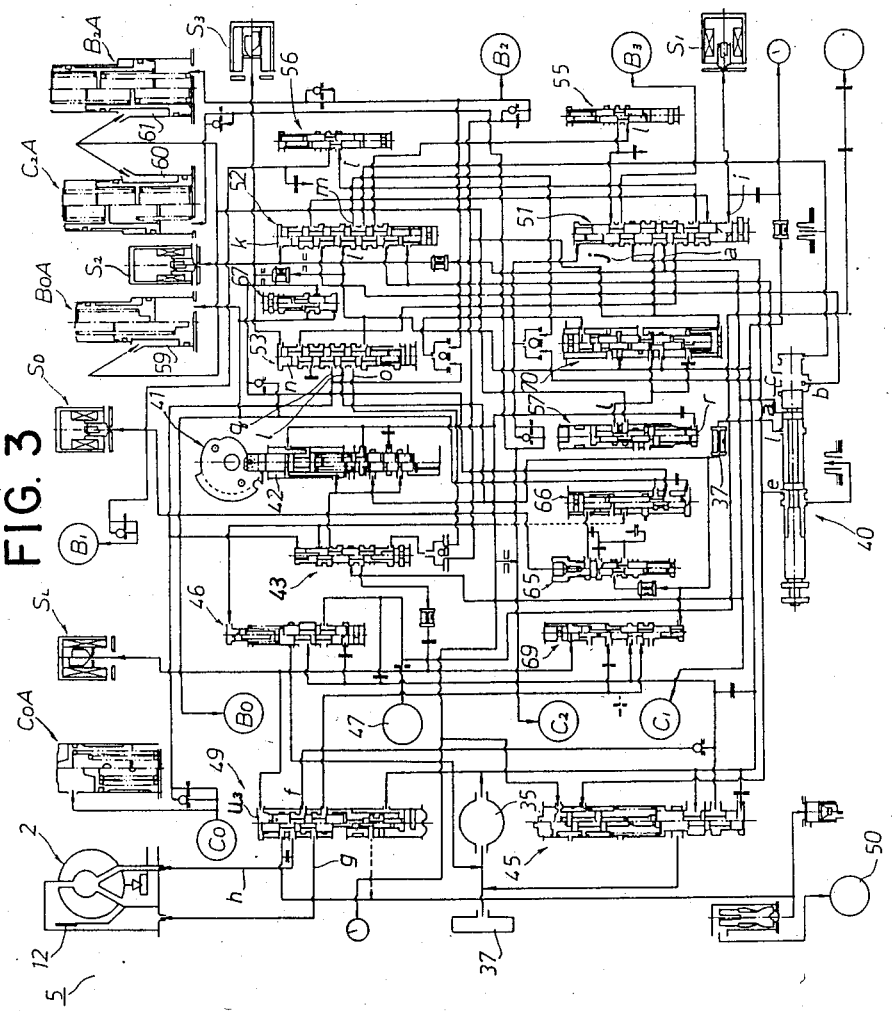
FIG. 3 is a hydraulic circuit diagram of a hydraulic control circuit of the automatic transmission shown in FIG. 2.

As will be seen from FIG. 3, the hydraulic speed changing control mechanism 5 is composed of various parts such as valves, as well as other constituents such as an accummulator, orifice 36 and a filter 37.

Figure 5:
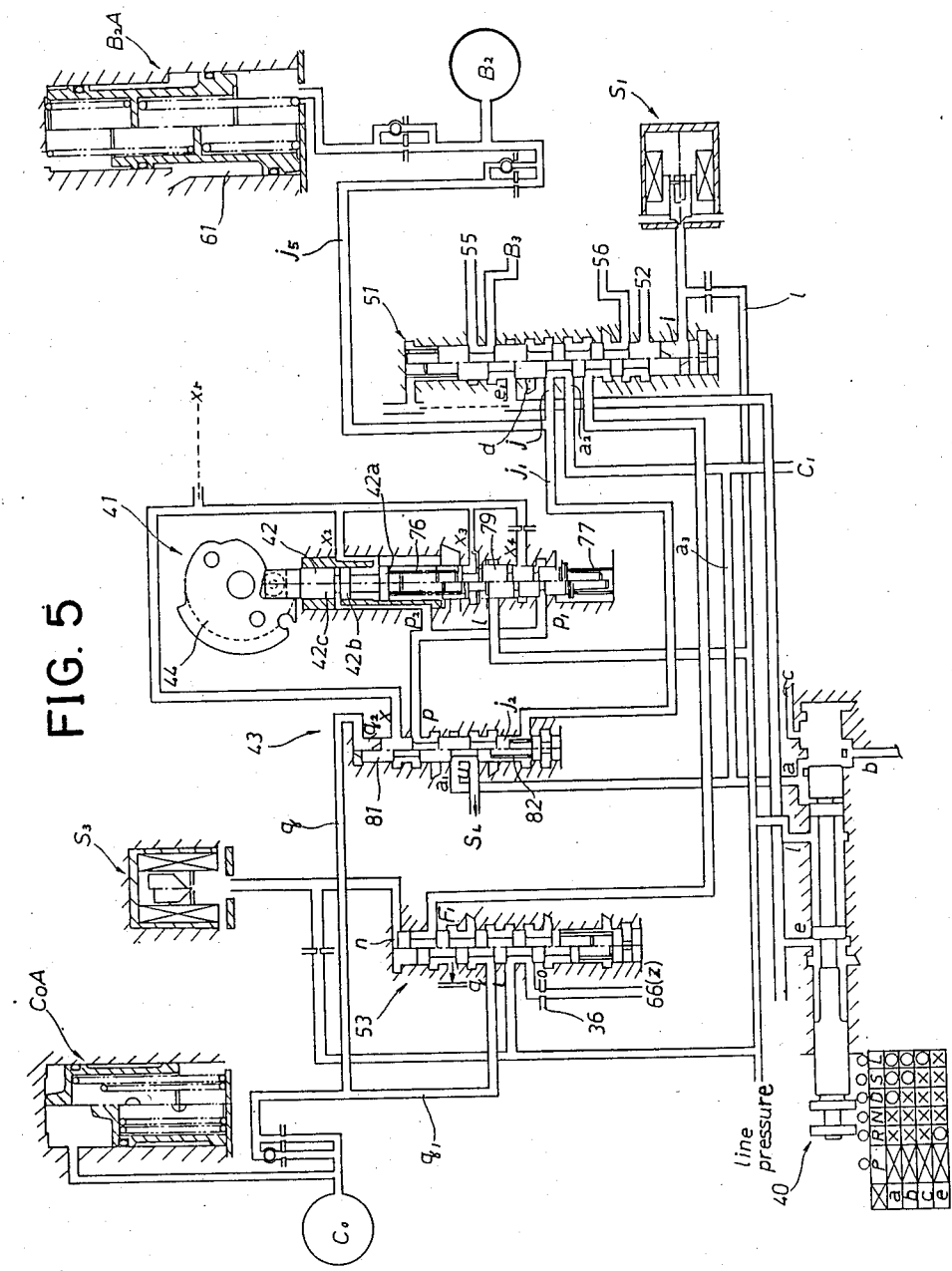
FIG. 5 is an illustration of a cut-back pressure controlling section of the hydraulic circuit.

A description will be made hereinunder as to the functions of the respective valves. The manual valve 40 is operated to assume one of the ranges P, R, N, D, S and L, thereby switching the oil passages a, b, c and e as shown in FIG. 5. The line pressure is provided in the oil passage l. A throttle valve 41 is provided with a downshift plug 42. A cam is rotated in response to the depression of an accelerator pedal, so that a throttle pressure corresponding to the engine power is obtained. The cut-back valve 43 produces cut-back pressure as will be explained later. The cut-back pressure acts on the throttle valve 41. A primary regulator valve 45 is operated by the throttle pressure, so as to produce a line pressure corresponding to the load. Namely, during a heavy load operation, the primary regulator valve 45 increases the line pressure so as to ensure the operation of the clutches C and brakes B, whereas, during light load operation, the primary regulator valve 45 regulates the line pressure to a comparatively low level. A secondary regulator valve 46 is adapted to be operated by the pressure derived from the primary regulator valve 45, so as to control the pressure of the converter oil pressure supplied to the converter 2, as well as the pressure of the lubricating oil which is supplied to various parts 47 which need lubrication.

As will be explained later, the lock-up relay valve 49 and the lock-up control valve 69 are controlled by the solenoid valve $S_L$, so as to switch the flow of the oil to the lock-up clutch 12 and the oil cooler 50. A first shift valve 51 is adapted to switch the main transmission unit 21 between the 1st speed gear and the 2nd speed gear, i.e., the first speed and the third speed of the transmission 1 as a whole. The first shift valve 51 is operated by a solenoid valve $S_1$. More specifically, as the solenoid of the solenoid valve $S_1$ is de-energized, the line pressure is introduced into the oil chamber i, so that the line pressure passage a is blocked when the manual valve 40 selects one of the D, S and L ranges. Conversely, when the solenoid of the solenoid valve $S_1$ is energized, the oil passage a is brought into communication with the oil passage $j_1$, so that the line pressure is supplied to the brakes $B_2$ and also to accummulator $B_2A$ for the brakes $B_2$.

A second shift valve 52 conducts the shifting in the main transmission unit 21 between the 2nd speed gear and the 3rd speed gear, i.e., between the third speed and the fifth speed of the automatic transmission as a whole, as it is operated under the control of a solenoid valve $S_2$. Namely, when the solenoid of the solenoid valve $S_2$ is de-energized, the line pressure is introduced into the oil chamber k, and the line pressure passage l communicates with the oil passage m, whereby the line pressure is supplied to the direct clutch $C_2$ and also to the accummulator $C_2A$ for the clutch $C_2$. The line pressure passage, however, is blocked when the solenoid of the solenoid valve $S_2$ is energized.

A third shift valve 53 conducts switching of the state of the sub-transmission unit 16, under the control of a solenoid valve $S_3$. Namely, as the solenoid of the solenoid valve $S_3$ is turned on, the line pressure is introduced into the oil chamber n, so that the line pressure passage l is brought into communication with the oil passage o, whereby the line pressure is supplied through a later-mentioned Bo release control valve 65 to the O/D brake Bo and also to the accumulator $B_oA$ for the brake Bo. However, as the solenoid of the solenoid valve $S_3$ is turned off, the line pressure passage 1 is brought into communication with the oil passage q, thereby supplying the line pressure to the O/D direct clutch Co and an accummulator $C_oA$ for the clutch Co.

A first coast modulator valve 55 is supplied with the line pressure from the oil passage 1 through the port c via the second shift valve 52, when the manual valve 40 is in the L range, and regulates this pressure into a coast modulator pressure which is supplied through the first shift valve 51 to a 1st & Rev brake $B_3$.

A second coast modulator valve 56 is supplied with the line pressure from the oil passage 1 through the port b via the second shift valve 52 and the first shift valve 51, when the manual valve 40 is in the S range, and regulates the pressure to the coast modulator pressure which is supplied to the second brake $B_1$.

A first accummulator control valve 57 has an oil chamber r which is supplied with the throttle pressure. In response to this throttle pressure, the first accummulator control valve 57 regulates the line pressure 1 which is supplied through a later-mentioned second accummulator control valve 70, thereby producing an accummulator control pressure which is supplied to back pressure chambers 59, 60 and 61 of the respective accummulators $B_oA$, $C_2A$ and $B_2A$.

Besides the hydraulic components mentioned hereinabove, the hydraulic speed changing control mechanism 5 has various valves such as an $S_D$ modulator valve 65, $B_o$ release control valve 66, $B_o$ sequence valve 67 and a second accummulator control valve 70.

Figure 4:
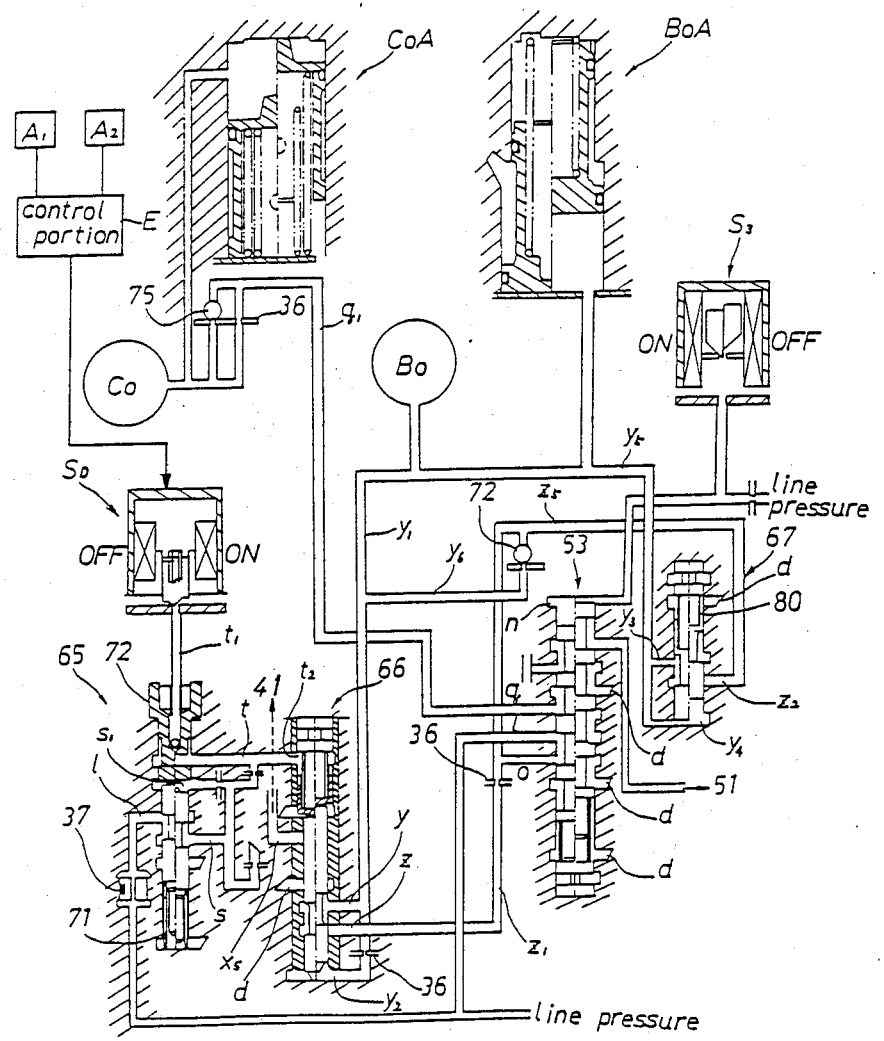
FIG. 4 is an illustration of an essential portion of the hydraulic control circuit shown in FIG. 3.

As shown in detail in FIG. 4, the $S_D$ modulator valve 65 receives the line pressure from the line pressure port 1 via the oil filter 37. The line pressure is further fed to the upper end oil chamber $s_1$ through an oil passage s, so as to serve as a feedback pressure. This feedback pressure produces a downward force which acts counter to the upward force of a spring 71, thereby producing a predetermined pressure of, for example, 4 kg/cm$^2$. The thus regulated solenoid modulator pressure is supplied to the oil passage t. In addition, the oil pasage t communicates with the solenoid valve $S_D$ through a plug 72 and an oil passage $t_1$ and also with a Bo release control valve 66. The control pressure produced by the on-off control or duty-ratio control of the solenoid valve $S_D$ is supplied to the oil chamber $t_2$, thereby controlling the control valve 66. The solenoid valve $S_D$ is controlled by a signal which is formed by a control portion E in accordance with the outputs from the rotation sensors $A_1$, $A_2$.

When the solenoid valve $S_D$ is adapted for on-off control, the throttle pressure is supplied to the oil passage $x_5$, thereby setting a brake release pressure corresponding to the change in the load. The port y of the $B_o$ release control valve 66 is held in communication with the O/D brake $B_o$ and the accummulator $B_oA$, through an oil passage $y_1$, and also with a lower end oil chamber $y_2$ through an orifice 36. The oil pressure introduced into the lower end oil chanmber $y_2$ serves as a feedback pressure. The oil passage $y_1$ leading from the brake $B_o$ and the accummulator $B_oA$ leads to a port $y_3$ of the sequence valve 67, through a by-pass passage $y_5$, and further to the lower end oil chamber $y_4$ of the valve 67. The pressure introduced into the lower end oil chamber $y_4$ serves as feedback pressure. The feedback pressure acting in the oil chamber $y_4$ produces a force which balances the force of a spring 80 on the upper side. The spring 80 is adjusted so that it produces a force corresponding to the initial piston operation pressure at which the brake disks of the O/D brake $B_o$ commence to contact with each other. Thus, the sequence valve 67 assumes the position shown in the left half part in FIG. 4, until the pressure is increased to the initial piston operation pressure, so that the hydraulic pressure is supplied to the O/D brake $B_o$ through the port $z_2$ and the port $y_3$. However, when the pressure exceeds the initial piston operation pressure, the sequence valve 67 is switched to the position shown in the right half part in FIG. 4, so that the ports $z_2$ and $y_3$ are blocked. The port z of the control valve 66 communicates with the port o of the third shift valve 53 through the oil passage $z_1$ and the orifice 36. The port o in turn communicates with a port $z_2$ of the sequence valve 67, through a by-pass passage $z_5$. On the other hand, an oil passage $y_6$ branching from the oil passage $y_1$ communicates with the by-pass passage $z_5$ through a check valve 72. On the other hand, the third shift valve 53 has an upper chamber n which communicates with the solenoid valve $S_3$, while its port 1 communicates with the line pressure passage. The third shift valve 53 further has a port q which communicates with the O/D-direct clutch $C_o$ and the accumulator $C_oA$ through an oil passage $q_1$ and an orifice 36. A check valve 75, which permits the discharge of the oil from the clutch $C_o$, is connected in parallel to the orifice 36 in the oil passage $q_1$. A symbol d represents a drain port.

The second accumulator control valve 70 is provided for accomplishing the following purpose. When the main transmission unit 21 is upshifted while the sub-transmission unit 16 selects the O/D speed, the capacities of the brakes in the main transmission unit are excessive as compared with the case where the sub-transmission unit is in the direct coupling mode. In such a case, therefore, the second accumulator control valve 70 lowers the pressure supplied to the back pressure chambers 59, 60 and 61 of the accumulators $B_oA$, $C_2A$ and $B_2A$, thereby optimizing the brake capacities.

As will be clearly seen also from FIG. 5, the spool 81 of the cut-back valve 43 is urged upwardly by a spring 82. The cut-back valve further has the upper chamber $q_2$ on the upper side of the spool 81 and a lower chamber $j_2$ on the lower side of the spool 81. The spring 82 mentioned above is loaded in the lower chamber $j_2$. The upper chamber $q_2$ communicates through the oil passage q with the oil passage $q_1$ leading to the O/D direct clutch $C_o$, while the lower chamber $j_2$ communicates with the port j of the first shift valve 51 through the oil passage $j_1$. The port j also communicates with the brake $B_2$ and the accummulator $B_2A$ through the oil passage $j_5$. The cut-back valve 43 also has the port x which receives the throttle pressure from the throttle valve 41 which in turn causes cut-back pressure to be supplied to the ports $p_1$ and $p_2$ of the throttle valve 41 from the port p which is selectively opened and closed in accordance with the state of the valve 41. The throttle valve 41 has a downshift plug 42 which is adapted to be operated by a throttle cam 44 operatively connected to the accelerator pedal. The throttle valve 41 further has a throttle spool 79 which opposes the downshift plug 42 across a spring 76. The throttle spool 79 is urged upwardly by a lower spring 77. The arrangement is such that the spool 79 is moved downwardly by the force transmitted through the spring 76 in accordance with the rotation of the throttle cam 44, whereby a pressure proportional to the throttle opening is supplied from the line port 1 to the throttle port $x_3$. Furthermore, the throttle pressure is transmitted to the port $x_4$, while the cut-back pressure is supplied to the port $p_1$. These pressures produce an axial force corresponding to the difference in the diameter of the lands on the spool 79. The force acts to drive the spool 79 backward against the force of the spring 76. When the spool 79 has been moved to a position where a balance is obtained between the forces produced by the springs 76 and 77, the line port 1 is closed so that the throttle pressure settles at a level corresponding to the throttle opening level and the vehicle running speed. The downshift plug 42 has lands 42a, 42b and 42c. The area of the land 42a is greater than that of the land 42b which in turn is greater than that of the land 42c. The oil pressure from the port $x_2$ acts on the lands 42a, 42b, while the cut-back pressure introduced through the port $p_2$ is applied to the lands 42b, 42c. These pressures produce an axial force which serves to reduce the force by which the downshift plug 42 is pressed against the cam 44.

As will be seen from FIG. 1, the cut-back valve 43 is further provided with ports $a_1$ and u which are isolated from each other when the cut-back valve 43 assumes a cut-back pressure shut-off position (right half part in FIG. 1) but communicates with each other when the same is in the cut-back pressure supply position (left half part in FIG. 1). The port $a_1$ is in communication with the port a of the manual valve 40, i.e., the port (see FIG. 5) which receives the line pressure when the manual valve selects the D,S or L range. The port a communicates also with the port $a_2$ of the first shift valve 51. On the other hand, the port u is communicated with the oil pasage $u_2$ which leads to the lock-up solenoid valve $S_L$ through the oil passage $u_1$ and the orifice 36, and also with the control oil chamber $u_3$ of the lock-up relay valve 49 and the oil chamber $u_4$ of the lock-up control valve 69.

The lock-up relay valve 49 has ports $M_1$, $V_1$, $Q_1$, $T_1$ and $R_1$, as well as the line pressure port 1 and the drain port d. The port $M_1$ communicates with an oil passage M which receives the converter pressure derived from the primary regulator valve 45. The port $Q_1$ communicates with the lock-up-on port $Q_2$ through the oil passage Q, while the port $R_1$ communicates with the lock-up-off port $R_2$ through the oil passage R. The port $T_1$ leads to the oil cooler 50 through the oil passage T and the check valve 85. The port $V_1$ leads to the port $V_3$ of the lock-up control valve 69 through the oil passage V and further to the port $V_2$ through the orifice 36. The oil passage V is drained through an orifice. The port $M_2$ of the control valve 69 receives the converter pressure from the oil passage M, while the lower chamber l receives the line pressure. A numeral 86 designates a by-pass valve provided in a passage by-passing the oil cooler 50.

The operation of the embodiment explained hereinbefore is as follows.

The table of FIG. 6 shows the states of various operational elements of the multi-speed automatic transmission 1 such as the solenoid valves $S_1$, $S_2$, $S_3$, $S_L$, $S_D$, clutches $C_o$, $C_1$, $C_2$, brakes $B_o$, $B_1$, $B_2$, $B_3$ and one-way clutches $F_o$, $F_1$, $F_2$, in respective ranges P,R and N and at respective speeds in ranges D, S and L.

When the automatic transmission selects the first speed in the D or S range, the O/D direct clutch $C_o$, one-way clutches $F_o$, $F_2$ and the forward clutch $C_1$ are held in engaged states, while other elements are disengaged, as shown in FIG. 7. In the sub-transmission unit 16, therefore, the planetary gear unit 17 rotates as a unit because the clutch $C_1$ and the one-way clutch $F_o$ are engaged, so that the rotation of the input shaft 15 is directly transmitted to the input shaft 26 of the main transmission unit 21. The rotation of the input shaft 26 is transmitted through the clutch $C_1$ to the ring gear 33 of the front planetary gear unit 19 and is further transmitted to the carrier 28 and the output shaft 27 which is integral with the carrier 28. At the same time, this rotation tends to cause a counter-clockwise rotation of the carrier 34 of the rear planetary gear unit 20 through the sun gear 30. However, the counter-clockwise rotation of the carrier 34 is prevented by the one-way clutch $F_2$ so that the planet gear 31 rotates about its axis, thereby transmitting the rotation to the ring gear 32 which is integral with the output shaft 27. Thus, the main transmission unit selects the 1st speed gear, while the sub transmission unit 16 is in the direct coupling state, whereby the transmission as a whole selects the first speed. In this state, a part of the power is transmitted to the output shaft 27 through the front planetary gear unit 19, while the other part of the power is transmitted through the rear planetary gear unit 20. That is, the load is shared by both planetary gear units.

When the first speed is selected, the solenoid of the solenoid valve $S_3$ is not energized, so that the third shift valve 53 takes the position shown by the right half part of FIG. 5, so that the line pressure of the line pressure port 1 is supplied to the O/D clutch $C_o$ and the accumulator $C_oA$ through the port q and the oil passage $q_1$, and also to the upper chamber $q_2$ of the cut-back valve 43. On the other hand, the solenoid of the solenoid valve $S_1$ also is not energized, so that the first shift valve 51 take the position shown at the right half part in FIG. 5. Therefore, the line pressure supplied from the line port 1 through the port a is supplied to the forward clutch $C_1$ while the port $a_2$ is blocked in the first shift valve 51 so that the oil pressure is not applied to the brake $B_2$ and the lower chamber $j_2$ of the cut-back valve 43. Consequently, the spool 81 of the cut-back valve 43 is moved by the oil pressure in the upper chamber $q_2$ against the force of the spring 82 to the position shown at the right half part in the Figure, so that the port x and the port p are isolated from each other, thereby preventing the application of the cut-back pressure to the throttle valve 41.

In this state, the port $a_1$ of the cut-back valve 43 is blocked (FIG. 1), so that the line pressure from the port a cannot reach the port u. Therefore, the pressure is not applied to the lock-up solenoid $S_L$ and the release valve 49, nor to the oil chambers $u_3$ and $u_4$ of lock up control valve 69. In this state, the relay valve 49 assumes the position shown at left half part in FIG. 1, even if the solenoid of the solenoid valve $S_L$ is energized. In addition, the control valve 69 also is held in the position shown at the left half part. The lock-up clutch 12 therefore is not engaged.

When the second speed is selected in D or S range, the O/D brake $B_o$, one-way clutch $F_2$ and the forward clutch $C_1$ are engaged, while other elements are disengaged, as shown in FIG. 8. Therefore, in the sub-transmission unit 16, the sun gear 23 is locked by the brake $B_o$, while the carrier 24 is rotated causing the planet gear 22 to rotate about its axis, thereby transmiting the power to the ring gear 25, whereby the input shaft 26 of the main transmission unit 21 is driven at an increased speed, i.e., the overdrive mode O/D is attained. On the other hand, the main transmission unit 21 still selects the 1st speed gear as in the case where the automatic transmission as a whole selects the first speed, so that the transmission as a whole selects the second speed by the coupling between the first speed gear selected by the main transmission unit 21 and the overdrive (O/D) selected by the sub-transmission unit 16.

In this state, the solenoid of the solenoid valve $S_3$ is energized as shown in FIG. 4, so that the line pressure is supplied to the upper chamber n of the third shift valve 53, whereby the third shift valve 53 is switched to the state shown at the left part in the Figure. As a result, the pressurized oil is drained from the clutch $C_o$ and the accumulator $C_oA$ through the drain port d via the port q, so that the clutch $C_o$ is disengaged and the line pressure port l is brought into communication with the port o. When the line pressure from the port o is below the initial piston operation pressure, the line pressure is supplied directly to the O/D brake $B_o$ through the by-pass passage $z_5$, ports $z_2$ and $y_3$ of the sequence valve 67, and the by-pass passage $y_5$. However, when the line pressure exceed the initial piston operation pressure, the sequence valve 67 is switched to the position shown at the right half part by the feedback pressure in the oil chamber $y_4$, so that the line pressure from the port o is delivered to the port z of the $B_o$ release control valve 66 through the orifice 36 and the oil passage $z_1$. Meanwhile, the control valve 66 is held in the position shown at left half part in the Figure, so that the port z and the port y communicate with each other, whereby the line pressure is supplied to the brake $B_o$ and the accumulator $B_oA$ through the oil passage $y_1$, thereby engaging the brake $B_o$.

In this state, the oil in the O/D clutch Co is drained, so that the oil in the upper chamber $q_2$ is drained (FIG. 5). In addition, the first shift valve 51 is held in the position shown at the right half part in FIG. 5 and no oil pressure is applied to the lower chamber $j_2$. Therefore, the spool 81 of the cut-back valve 43 is returned by the force of the spring 82 upwardly to the position shown at the left half part in FIG. 1, whereby the port x and the port p communicate with each other. Consequently, the throttle pressure from the port x is applied to the ports $p_1$ and $p_2$ of the throttle valve 41 through the port p, so as to move the spool 79 backward against the force of the spring 76, whereby the throttle pressure is reduced by a predetermined amount and the force by which the downshift plug is pressed onto the throttle cam 44 is decreased.

When the transmission as a whole selects the third speed in D range, the O/D clutch $C_o$, one-way clutch $F_o$, forward clutch $C_1$, one-way clutch $F_1$ and the brake $B_2$ are engaged, while other elements are disengaged, as shown in FIG. 9. Therefore, the sub-transmission unit 16 assumes the direct coupling mode explained before, so that the rotation of the input shaft 15 thereof is directly transmitted to the input shaft 26 of the main transmission unit 21. In the main transmission unit 21, the rotation of the input shaft 26 is transmitted to the ring gear 33 of the front gear unit 19 through the clutch $C_1$, tending to cause counter-clockwise rotation of the sun gear 30 via the planet gear 29. However, since the sun gear 30 is locked against counter-clockwise rotation a result of the one-way clutch $F_1$ due to the engagement of the brake $B_2$, the carrier 28 is rotated while the planet gear 29 rotates about its axis. Thus, the rotation of the input shaft 26 is transmitted to the output shaft 27 at the 2nd speed only through the front gear unit 19. Consequently, the transmission 1 as a whole operates with the third speed which is obtained by the combination between the direct-coupling speed of the sub transmission unit 16 and the 2nd speed provided by the main transmission unit 21.

In this state, the solenoid of the solenoid valve $S_1$ is energized so that the first shift valve 51 is switched to the state shown at the left half part in FIG. 5, so that the line pressure available at the port $a_2$ is transmitted to the port j, and the line pressure is supplied to the brake $B_2$ and the accumulator $B_2A$. The speed changing operation of the main transmission unit 21, i.e., the change in the rotational speed of the sun gear 30, is sensed by the rotary sensor $A_2$, so that the duty-ratio control or on-off control of the solenoid valve $S_D$ is effected by the electric signal coming from the control portion E, thereby reducing the modulator pressure in the oil passage t. Namely, the $S_D$ modulator valve 65 receives the line pressure through the line port l and regulates this pressure by the force of the spring 71 and the force produced by the pressure fed back to the upper chamber $s_1$, thus producing a regulated pressure which is delivered to the oil passage t. This modulator pressure is reduced as a result of the control effected by the solenoid valve $S_D$ so that the pressure is reduced also in the upper chamber $t_2$ of the release control valve 66 which communicates with the oil passage t. Therefore, the control valve 66 is switched to the position shown at the right half part in FIG. 4 by the pressure which is fed back to the lower chamber $y_2$ from the brake $B_o$, so that the oil from the brake $B_o$ and the accummulator $B_oA$ is drained from the drain port d via the oil passage $y_1$ and the port y. At this moment, the rotation sensor $A_2$ detects the completion of the speed changing operation of the main transmission unit 21, i.e., the stop of rotation of the sun gear 30. In response to the output from the rotation sensor $A_2$, the control portion E produces an electric signal so as to de-energize the solenoid of the solenoid valve $S_3$, thereby switching the third shift valve 53 to the position shown at right half part in FIG. 1. As a result, the line pressure port l is communicated with the port q, so that the line pressure is supplied to the clutch $C_o$ and the accummulator $C_oA$ through the oil passage $q_1$, thereby causing the clutch $C_o$ to engage. At the same time, the port o is brought into communication with the drain port d, so that the oil in the O/D brake $B_o$ is drained completely and quickly from the drain port d, via the oil passage $y_6$, check valve 72, oil passage $z_5$ and the port o, whereby the speed changing operation in the sub-transmission unit 16 is completed. The operation for releasing the O/D brake $B_o$, therefore, coincides with the operation for engaging the brake $B_2$.

When the third speed is selected by the transmission 1, the hydraulic pressure is supplied to the O/D clutch $C_o$ and also to the upper chamber $q_2$ of the cut-back valve 43. At the same time, the hydraulic pressure is supplied also to the lower chamber $j_2$ through the oil passage $j_1$, as a result of supply of a hydraulic pressure to the brake $B_2$. However, since the upward force which is the sum of the force of the spring 82 and the force produced by the pressure acting in the lower chamber $j_2$ exceeds the downward force produced by the pressure acting in the upper chamber $q_2$, the spool 81 is held in the raised position shown at left half part in FIG. 5. In this state, the cut-back pressure is supplied to the throttle valve 41, as in the case where the second speed is selected.

Figure 10:
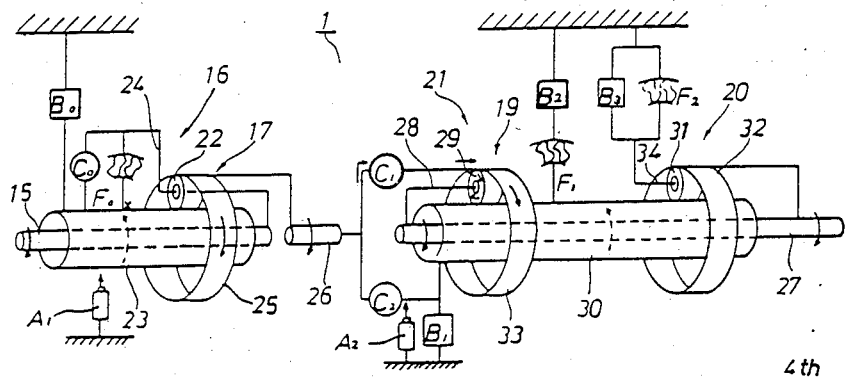

When the transmission 1 as a whole selects the fourth speed in D range, the O/D brake Bo, forward clutch $C_1$, brake $B_2$ and the one-way clutch $F_1$ are engaged, while other elements are disengaged, as will be seen from FIG. 10. Therefore, the sub-transmission unit 16 is in the overdrive (O/D) mode, while the main transmission unit 21 selects the second speed gear, thus attaining the fourth speed in the automatic transmission 1 as a whole.

When the fourth speed is selected, the upper chamber $q_2$ of the cut-back valve 43 is drained as a result of the release of the O/D clutch $C_o$. On the other hand, since the first shift valve 51 is held in the position shown at left half part in FIG. 1, the line pressure from the port a is delivered to the lower chamber $j_2$, so that the cutback valve 43 assumes the cut-back pressure supply position at which the ports x and p communicate with each other.

Figure 11:
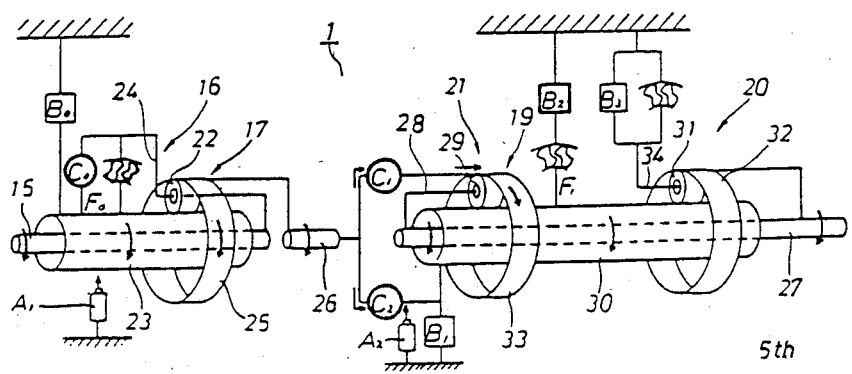

In the fifth speed operation of the automatic transmission in the D range, the O/D clutch $C_o$, one-way clutch $F_o$, forward clutch $C_1$, direct clutch $C_2$ and the brake $B_2$ are engaged, while other elements are disengaged, as shown in FIG. 11. Therefore, the sub transmission unit 16 is held in the direct-coupling mode as stated before. On the other hand, since the clutches $C_1$ and $C_2$ are engaged, the front planetary gear unit 19 rotates as a unit, so that the rotation of the input shaft 26 is transmitted directly to th output shaft 27. As a result, the fifth speed is obtained in the automatic transmission 1 as a whole in which the input shaft 15 and the output shaft 27 rotate as if they are integral, by the combination between the direct-coupling state of the sub-transmission unit 16 and the 3rd speed, i.e., direct-coupling state, of the main transmission unit 21.

The solenoid $S_1$ is kept energized even in this fifth speed operation of the automatic transmission 1, so that the first shift valve 51 still remains in the position shown at left half part in FIG. 5. Therefore, the supply of the oil pressure to the lower chamber $j_2$ of the cut-back valve 43 is still maintained. Accordingly, the cut-back valve 43 is held in the cut-back pressure supply position shown at the left half part in the Figure, even if the hydraulic pressure is supplied to the upper chamber $q_2$ when the O/D clutch $C_o$ is engaged.

Figure 12:
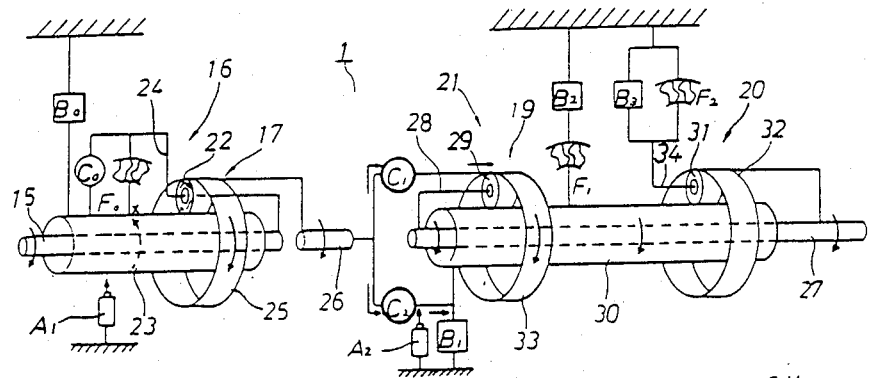

When the automatic transmission 1 selects the sixth speed in D range, the O/D brake $B_o$, forward clutch $C_1$, direct clutch $C_2$ and the brake $B_2$ are engaged, while other elements are disengaged, as shown in FIG. 12. Therefore, the sub transmission unit 16 is in the overdrive (O/D) mode as explained before, while the main transmission unit 21 selects the 3rd speed gear mentioned before. Therefore, the automatic transmission as a whole takes the sixth speed, by combination of the overdrive mode of the sub transmission and the 3rd speed of the main transmission unit 21. The first shift valve 51 assumes the state shown at left half part in the Figure also when the sixth speed is selected, and the cut-back valve 43 is held in the cut-back pressure supply position by the hydraulic pressure which acts in the lower chamber $j_2$.

When the automatic transmission 1 as a whole selects one of the second, third, fourth, fifth and sixth speeds, the port $a_1$ of the cut-back valve 43 is held in communication with the port u, so that the line pressure from the port a is supplied through the oil passage $u_1$ and the orifice 36 to the oil passage $u_2$ which leads to the lockup solenoid valve $S_L$. In this state, if the solenoid of the solenoid valve $S_L$ is not energized, the line pressure is not supplied to the control oil chambers $u_3$ and $u_4$ of the lock-up relay valve 49 and the conrol valve 69, so that the valves 49 and 69 are held in positions which are shown at left half parts in FIG. 1. Consequently, the converter pressure in the oil passage M is introduced to the lock-up off port $R_2$ through the ports $M_1$ and $R_1$ of the relay valve 49, so as to maintain the lock-up clutch in the disengaged state. Therefore, the rotation of the input member 13 transmitted from the engine is delivered to the input shaft 15 of the speed changing gear mechanism 3 through the flow of the oil in the torque converter 2. The flow of oil from the torque converter 2 is discharged to the oil passage T via the lock-up-on port $Q_2$ and the ports $Q_1$ and $T_1$ of the relay valve 49. The oil is then discharged to the oil cooler 50 through the check valve 85. The converter pressure in the oil passage M is fed to the oil passage V through the ports $M_2$ and $V_3$ of the control valve 69 and is also fed back to the upper side of the spool 86 through the port $V_2$, whereby a predetermined pressure is maintained in the oil passage V. On the other hand, as the solenoid of the solenoid valve $S_L$ is energized, the line pressure is supplied to the control oil chambers $u_3$ and $u_4$ of the relay valve 49 and the control valve 69, so that both valves are switched to the positions shown at right half parts in FIG. 1. In this state, the converter pressure in the oil passage M serves to engage the lock-up clutch 12 of the torque converter 2 through the ports $M_1$ and $Q_1$ of the relay valve 49, whereby the rotation of the input member 13 is directly transmitted to the input shaft 15 through the lock-up clutch 12. In addition, the flow of oil from the torque converter 2 is discharged through the off port $R_2$ and is further introduced to the port $V_3$ of the control valve 69 through the ports $R_1$ and $V_1$ of the relay valve 49. The oil is then drained into the oil pan 11 through the drain port d.

Figure 13:
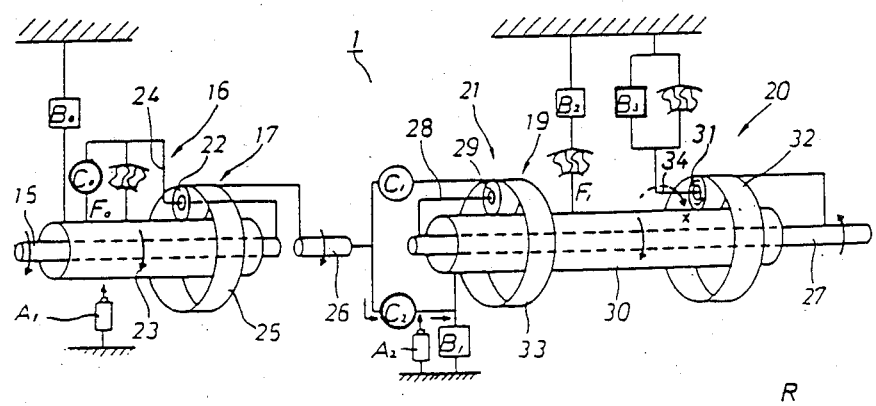

When the manual valve is positioned to select the R range, the O/D clutch $C_o$, one-way clutch $F_o$, direct clutch $C_2$ and the brake $B_3$ are engaged, while other elements are disengaged, as will be seen from FIG. 13. Therefore, the sub-transmission unit 16 is in the direct-coupling mode, whereas, in the main transmission unit 21, the rotation of the input shaft 26 is directly transmitted to the sun gear 30 through the clutch $C_2$. In addition, since the carrier 34 of the rear planetary gear unit 20 is locked against rotation by the brake $B_3$, the rotation of the sun gear 30 is transmitted to the ring gear 32 through the planet gears 31 which rotate about their own axes so as to reverse the direction of rotation, whereby the output shaft 27 is rotated in the direction counter to the direction of rotation of the input shaft 26, thus attaining the reversing mode of the automatic transmission.

In this reversing mode, the port a is not supplied with the line pressure any more, because the manual valve 40 has been switched to the R range. Consequently, the oil in the brake $B_2$, as well as the oil in the lower chamber $j_2$ of the cut-back valve 43, is drained. On the other hand, the solenoid of the third solenoid valve is not energized, while the third shift valve 53 is in the position shown at right half part in FIG. 5. Therefore, the pressure existing in the line pressure port l is supplied to the O/D clutch $C_o$ through the port q and also to the upper chamber $q_2$ of the cut-back valve 43. Therefore, the cut-back valve 43 is held in the state shown at right half part in FIG. 5, as in the case where the first speed is selected. Therefore, the throttle pressure at the port x is interrupted, and the cut-back pressure in the ports p, p$_1$ and p$_2$ is drained.

The oil passage leading to the brake B$_2$ is drained also when the P or N range is selected. When P or N range is selected, the solenoid of the third solenoid valve S$_3$ is not energized, and the cut-back valve 43 also is held in the cut-back pressure shut-off position as in the case of the R range.

When the manual valve is positioned to select one of the ranges R, P and N, the port a$_1$ of the cut-back valve 43 is blocked and the port a of the manual valve 40 is isolated from the line pressure port l, so that the pressure is not supplied to the passage u$_2$ which leads to the lock-up solenoid valve S$_L$. The lock-up clutch 12 therefore is not engaged.

When the third or fourth speed is selected in the S or L range, the operation is similar to that explained in connection with the third and fourth speed operation in D range (see FIGS. 9 and 10) as explained before. In the S or L range, however, the coast brake B$_1$ is engaged, so that the sun gear 30 is prevented from rotating in both directions, thus enabling an engine brake to effect. In upshifting from the second speed to the third speed, the solenoid valve S$_D$ is controlled so that the sub-transmission unit 16 and the main transmission unit 21 are shifted simultaneously as in the case of the D range.

When the first or second speed is selected in the L range, the operation is similar to that of the first or second speed in the D range (see FIGS. 7 and 8). In this case, however, the brake B$_3$ is engaged, so that the carrier 34 of the rear planetary gear unit is prevented from rotating in both directions, whereby engine braking is put into effect. In third and fourth speeds and first and second speeds in the S or L range, the operation of the cut-back valve 43 is the same as that performed in the D range.

Figure 14:
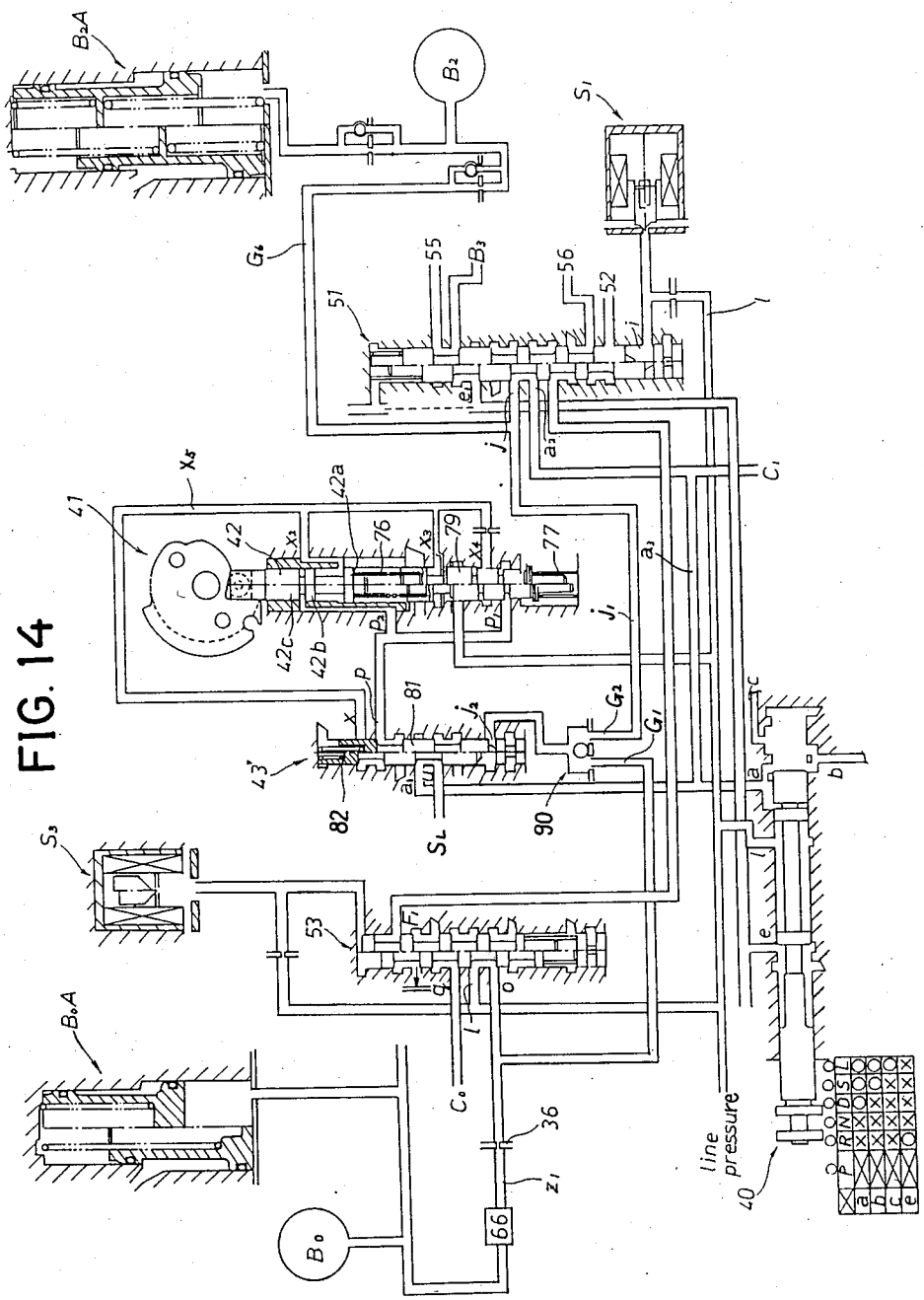
FIG. 14 is an illustration of a modified cut-back pressure controlling section.

Another embodiment of the invention will be explained hereinunder with reference to FIG. 14.

In this embodiment, the cut-back valve 43' has a spool 81 which is urged downwardly by a spring 82. A lower oil chamber j$_2$ is defined at the lower side of the spool 81. The lower chamber j$_2$ communicates, through a double check valve 90 which allows the supply of pressure from either one of two directions, with the brake Bo of the overdrive planetary gear unit and with the brake B$_2$ which prevents, in cooperation with the one-way clutch F$_1$, the sun gear 30 of the main transmission unit from rotating in one direction.

When the automatic transmission 1 as a whole selects the first speed, the sub-transmision unit 16 is in the direct-coupling mode with the O/D-direct clutch C$_o$ engaged and the brake B$_o$ released, while the main transmission unit 21 selects the 1st speed gear with the forward clutch C$_1$ engaged and the brake B$_2$ disengaged, as shown in FIG. 7. In this state, the hydraulic pressure is not applied to the lower chamber j$_2$, so that the cut-back valve 43' is urged by the spring 82 to the position shown at the right half part in the FIG. 14, so that the port x and the port p are isolated from each other so that the cut-back pressure is not supplied to the throttle valve 41. This operation of the cut-back valve 43' applies also to the case where the R, N or P range is selected, because the O/D brake B$_o$ and the 2nd brake B$_2$ are not supplied with the hydraulic pressure.

Consequently, when the automatic transmission selects the first speed or when the manual valve is positioned to select one of the R, N and P ranges, the port u of the cut-back valve 43' is not supplied with the oil pressure, so that the lock-up clutch 12 is not connected regardless of the state of the lock-up solenoid valve S$_L$.

When the automatic transmission is upshifted from the first speed to the second speed, the main transmission unit 21 is maintained the 1st speed because the forward clutch C$_1$ and the brake B$_2$ are held in the engaged and disengaged states, respectively, whereas the sub-transmission unit 16 is upshifted from the direct coupling mode to the overdrive mode O/D because the brake B$_o$ and the O/D-direct clutch C$_o$ are engaged and disengaged, respectively, as shown in FIG. 8. As a result of the supply of the hydraulic pressure to the O/D brake B$_o$, the lower chamber j$_2$ of the cut-back valve 43' receives the oil pressure through the double check valve 90, so that the spool 81 of the valve 43' is moved upwardly against the force of the spring 82 to the position shown at left half part in FIG. 14, thereby establishing a communication between the port x and the port q. Consequently, the cut-back pressure is supplied to the ports p$_1$ and p$_2$ of the throttle valve 41, so that the spool 79 is forcibly moved backward against the force of the spring 76, thereby setting the throttle pressure at a low level.

As the automatic transmission is upshifted from the second to the third speed, the main transmission unit 21 attains the second speed because the brake B$_2$ is engaged in addition to the engagement of the forward clutch C$_1$. Meanwhile, in the sub-transmission unit 16, the brake B$_o$ is released and the clutch C$_o$ is engaged, thereby attaining a downshift from the overdrive O/D mode to the direct-coupling mode, as shown in FIG. 9. Consequently, the double check valve 90 is operated so as to block the port G$_1$ while opening the port G$_2$, whereby the hydraulic pressure form the brake B$_2$ is supplied to the lower chamber j$_2$ of the cut-back valve 43' through the oil passage j$_1$. Consequently, the spool 81 is held in the upper position shown at the left half part in FIG. 14, thus maintaining the communication between the ports x and p. When the automatic transmission as a whole is upshifted to fourth, fifth and further to sixth speeds, the brake B$_o$ in the main transmission unit 21 is held in an engaged state, whereas the brake B$_o$ in the sub-transmission unit 16 is alternatingly engaged and disengaged. However, since the double check valve 90 is held in the position mentioned above so as to maintain the supply of the hydraulic pressure to the lower chamber j$_2$ from the brake B$_2$, the cut-back valve 43 is held in the cut-back pressure supply position as shown at the left half part in the Figure.

Therefore, when the automatic transmission selects one of second to sixth speeds, the hydraulic pressure from the port a$_1$ is delivered through the port u to the oil passage u$_2$ leading to the solenoid valve S$_L$, so that the lock-up clutch 12 is engaged and disengaged in accordance with the state of the solenoid valve S$_L$.

Although embodiments have been described with reference to a longitudinal automatic transmission for rear-wheel drive vehicles having the sub-transmission unit 16 on the front side and the main transmission unit 21 on the rear side, this is not exclusive and the invention can equally be applied to a transverse type automatic transmission for front-wheel drive vehicles in which the main transmission unit is disposed on the front side while the sub-transmission underdrive planetary unit is disposed on the rear side.

In the described embodiment, the sub-transmission unit 16 is composed of the overdrive planetary unit 17, while the main transmission unit 21 is composed of the front planetary gear unit 19 and the rear planetary gear unit 20. This arrangement is basically the same as that of the known overdrive automatic transmission. Thus, according to the invention, a multi-speed automatic transmission can be produced at a low cost, by making an efficient use of existing production lines, without requiring a substantial change in the line arrangement.

Although the invention has been described through specific terms, it is to be noted here that the described embodiments are only illustrative, and various changes and modifications are possible without departing from the scope of the invention which is limited solely by the appended claims.

What is claimed is:

1. A lock-up clutch control device for a multi-speed automatic transmission, the automatic transmission having an input shaft, a speed changing gear mechanism including a sub-transmission unit and a main transmission unit operatively connected to the sub-transmission unit for outputting multiple transmission speeds, the sub-transmission unit outputting at least a low speed when in a lower speed mode and a high speed that is greater than the low speed when in a higher speed mode, the main transmission unit shiftable between at least first and second gears to assume at least first and second speed modes for outputting the multiple speeds with the sub-transmission unit, frictional engagement elements respectively and operatively associated with the main transmission unit and the sub-transmission unit for controlling the sub-transmission unit and the main transmission unit to selectively change various power transmission paths in the main transmission unit and the sub-transmission unit by selectively switching the sub-transmission unit between the lower speed mode and the higher speed mode and by switching the main transmission unit between at least the first and second gears to vary the transmission speed output by the speed changing gear mechanism, and a torque convertor having a lock-up clutch operatively connected between the input shaft and the speed gear changing mechanism for converting torque from the input shaft to drive the speed changing gear mechanism, the torque being converted directly from the input shaft to drive the speed changing gear mechanism via actuation of the lock-up clutch, said lock-up control device comprising:

a lock-up operation means operatively connected to the frictional engagement elements of the main transmission unit and to the frictional engagement elements of the sub-transmission unit for producing a control signal dependent upon the operation of the frictional engagement elements controlling said sub-transmission unit and said main transmission unit, said lock-up operation means producing said control signal when the sub-transmission unit is in the higher speed mode or while the main transmission unit is in second gear or higher;

a signal transmission means operatively connected to said lock-up control device for transmitting said control signal from said lock-up operation means; and a lock-up relay valve operatively connected to said signal transmission means and the lock-up clutch, said lock-up relay valve controlling said lock-up clutch only when receiving said signal from said said signal transmission means.

2. A lock-up clutch control device for a multi-speed automatic transmission, the automatic transmission having an input shaft, a speed changing gear mechanism including a sub-transmission unit and a main transmission unit operatively connected to the sub-transmission unit for outputting multiple transmission speeds, the sub-transmission unit outputting at least a low speed when in a lower speed mode and a high speed that is greater than the low speed when in a higher speed mode, the main transmission unit shiftable between at least first and second gears to assume at least first and second speed modes for outputting the multiple speeds with the sub-transmission unit, frictional engagement elements respectively and operatively associated with the main transmission unit and the sub-transmission unit for controlling the sub-transmission unit and the main transmission unit to selectively change various power transmission paths in the main transmission unit and the sub-transmission unit by selectively switching the sub-transmission unit between the lower speed mode and the higher speed mode and by switching the main transmission unit between at least the first and second gears to vary the transmission speed output by the speed changing gear mechanism, and a torque convertor having a lock-up clutch operatively connected between the input shaft and the speed gear changing mechanism for converting torque from the input shaft to drive the speed changing gear mechanism, the torque being converted directly from the input shaft to drive the speed changing gear mechanism via actuation of the lock-up clutch, said lock-up control device comprising:

a manually operated valve shiftable to a plurality of ranges including a D range, said manually operated valve operatively connected to said frictional engagement elements for selectively actuating said frictional engagement elements depending upon the range at which said manually operated valve is shifted;

a throttle valve for establishing a throttle pressure corresponding to an operator command;

a lock-up relay valve and a solenoid valve operatively connected to said lock-up clutch for actuating said lock-up clutch; and a cut-back valve operatively connected to said lock-up relay valve, said solenoid valve, said throttle valve and said manually operated valve, said cut-back valve being in a cut-back position when said sub-transmission unit is in the higher speed mode or when the main transmission unit is in second gear or higher, said cut-back valve supplying fluid pressure to said throttle valve when at said cut-back position for applying a cut-back pressure to said throttle valve to reduce the throttle pressure established thereby and said cut-back valve supplying hydraulic pressure from said manually operated valve through said cut-back valve to said solenoid valve and said lock-up relay valve to facilitate actuation of said lock-up clutch when said manually operated valve is in said D range.

3. A lock-up clutch control device for a multi-speed automatic transmission as claimed in claim 2, wherein said cut-back valve comprises a spool having first and second ends, a first oil chamber adjacent said first end of said spool, a second oil chamber adjacent said second end of said spool, and biasing means connected to said spool for urging said spool towards said first oil chamber, said first oil chamber open to and communicating with a respective said frictional engagement element associated with said sub-transmission, said first oil chamber being supplied with hydraulic fluid from said respective frictional engagement element associated with said sub-transmission for pressurizing said first oil chamber to urge said spool away from first oil chamber when said sub-transmission is in the lower speed mode, said second oil chamber open to and communicating with a respective said frictional engagement element of said main transmission unit, said second oil chamber being supplied with hydraulic fluid from said respective frictional engagement element associated with said main transmission unit for pressurizing said second oil chamber to urge said spool along with said biasing means toward said first oil chamber when said main transmission unit is in the second gear or higher.

4. A lock-up clutch control device for a multi-speed automatic transmission as claimed in claim 2, wherein said cut-back valve comprises a spool, an oil chamber adjacent one end of said spool, and biasing means connected to said spool for urging said spool toward said oil chamber; and further comprising a double check valve connected between said oil chamber and a pair of hydraulic fluid lines for allowing hydraulic fluid from either of said pair of hydraulic fluid lines to pass into said oil chamber to pressurize said oil chamber, one of said pair of hydraulic fluid lines connected between said double-check valve and a respective frictional engagement element associated with said sub-transmission unit for supplying hydraulic fluid from said respective frictional engagement element associated with said sub-transmission unit when said sub-transmission unit is in said lower speed mode, and the other of said pair of hydraulic fluid lines connected between said double-check valve and a respective frictional engagement element associated with said main transmission unit for supplying hydraulic fluid from said respective frictional engagement element associated with said main transmission unit when said main transmission unit is in the second gear or higher.

5. A lock-up control device for a multi-speed automatic transmission as claimed in claim 2, wherein said sub-transmission unit comprises an overdrive planetary gear unit; and said main transmission unit comprises a front planetary gear unit and a rear planetary gear unit.

* * * * *